United States Patent
Sugie et al.

(10) Patent No.: US 7,597,998 B2
(45) Date of Patent: Oct. 6, 2009

(54) LEAD ACID BATTERY INCLUDING ANTIMONY

(75) Inventors: Kazuhiro Sugie, Shizuoka (JP); Kazuhiko Shimoda, Shizuoka (JP); Shinichi Iwasaki, Shizuoka (JP); Tsunenori Yoshimura, Shizuoka (JP)

(73) Assignee: Panasonic Corporation, Osaka (JP)

( * ) Notice: Subject to any disclaimer, the term of this patent is extended or adjusted under 35 U.S.C. 154(b) by 511 days.

(21) Appl. No.: 10/587,187

(22) PCT Filed: Apr. 22, 2005

(86) PCT No.: PCT/JP2005/007729

§ 371 (c)(1),
(2), (4) Date: Jul. 25, 2006

(87) PCT Pub. No.: WO2005/107004

PCT Pub. Date: Nov. 10, 2005

(65) Prior Publication Data

US 2007/0160910 A1    Jul. 12, 2007

(30) Foreign Application Priority Data

Apr. 28, 2004  (JP) .............................. 2004-133138

(51) Int. Cl.
- *H01M 4/56* (2006.01)
- *H01M 4/68* (2006.01)
- *H01M 2/28* (2006.01)
- *H01M 4/02* (2006.01)

(52) U.S. Cl. ...................... 429/225; 429/245; 429/161; 429/211

(58) Field of Classification Search ........................ None
See application file for complete search history.

(56) References Cited

U.S. PATENT DOCUMENTS

| | | | | | |
|---|---|---|---|---|---|
| 3,723,182 | A | * | 3/1973 | Venuto | 429/228 |
| 4,107,407 | A | * | 8/1978 | Koch | 429/225 |
| 5,128,218 | A | * | 7/1992 | Tokunaga et al. | 429/57 |
| 5,989,750 | A | * | 11/1999 | Ohba et al. | 429/251 |

FOREIGN PATENT DOCUMENTS

JP    2-121261 A    5/1990

(Continued)

OTHER PUBLICATIONS

Machine translation of JP 2003-346888, Yonemura Koichi, Dec. 5, 2003.*

*Primary Examiner*—Dah-Wei D Yuan
*Assistant Examiner*—Kwang Han
(74) *Attorney, Agent, or Firm*—McDermott Will & Emery LLP

(57) ABSTRACT

A lead acid battery of the present invention has: an electrode plate pack including a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive and negative electrode plates; a positive electrode connecting member connected to each positive electrode plate of the electrode plate pack; and a negative electrode connecting member connected to each negative electrode plate of the electrode plate pack. The positive electrode grid has a lead alloy layer including 0.01 to 0.2 parts by weight of Sb per 100 parts by weight of the positive electrode active material on at least a part of the surface thereof where the positive electrode active material layer is in contact. The negative electrode active material layer includes 0.0001 to 0.003 parts by weight of Sb per 100 parts by weight of the negative electrode active material.

5 Claims, 6 Drawing Sheets

FOREIGN PATENT DOCUMENTS

| | | |
|---|---|---|
| JP | 2-262258 A | 10/1990 |
| JP | 3-37962 A | 2/1991 |
| JP | 8-329975 A | 12/1996 |
| JP | 9-231996 A | 9/1997 |
| JP | 3102000 B2 | 8/2000 |
| JP | 2002-216774 A | 8/2002 |
| JP | 2003-346888 A | 12/2003 |

* cited by examiner

LEAD ACID BATTERY INCLUDING ANTIMONY

RELATED APPLICATIONS

This application is the U.S. National Phase under 35 U.S.C. § 371 of International Application No. PCT/JP2005/007729, filed on Apr. 22, 2005, which in turn claims the benefit of Japanese Application No. 2004-133138 filed on Apr. 28, 2004, the disclosures of which Applications are incorporated by reference herein.

TECHNICAL FIELD

The present invention relates to a lead acid battery. More particularly, the present invention relates to an improvement of service life characteristics of a lead acid battery used for vehicles carrying a stop-and-go-system and a regenerative-braking-system.

BACKGROUND ART

Conventionally, a lead acid battery has been used for starting an engine of a vehicle and for a back-up power source. Among these usages, a lead acid battery for starting an engine functions to supply electricity to various electric and electronic devices mounted on vehicles, in addition to a cell motor for starting an engine. After starting an engine, a lead acid battery is charged by an alternator. An output voltage and an output current of the alternator are set so that SOC (state of charge) of the lead acid battery is maintained to be 90 to 100%.

In recent years, a demand for an improvement of a fuel-efficiency of a vehicle is increasing, in view of environmental conservation. For such a demand, a vehicle carrying a stop-and-go-system and a regenerative-braking-system has been considered, for example. In the stop-and-go-system, an engine is stopped while the vehicle is idling, and in the regenerative-braking-system, a kinetic energy of a vehicle at the time of deceleration is converted to an electric energy, and the electric energy is stored.

In a vehicle carrying the stop-and-go-system, the lead acid battery is not charged when the vehicle is stopped in an idle stop mode. The lead acid battery sometimes supplies electric power to devices mounted on the vehicle while in such a state. Thus, in comparison with a conventional lead acid battery for starting engines, SOC of the lead acid battery inevitably becomes low. In a vehicle carrying the regenerative-braking-system, SOC of the lead acid battery has to be controlled to be lower, to about 50 to 90%, since electric energy is stored by the lead acid battery at the time of regeneration (deceleration).

In any of these systems, charge and discharge (hereinafter referred to as charge/discharge) are repeated frequently with a lower SOC domain than ever. Further, based on an increase in a dark current accompanied with vehicle parts increasingly becoming electrically powered, a discharge of the lead acid battery advances while a vehicle is stopped for a long period of time, thereby leaving a possibility for an over discharge.

Therefore, for a lead acid battery to be used in vehicles carrying these systems, service life characteristics under a usage mode in which charge/discharge is repeated frequently with a lower SOC domain need to be improved.

For deterioration factors of a lead acid battery under such usage mode, an insufficient charge due to decline in chargeability of the lead acid battery can be mentioned, mainly. Since a charge system of a vehicle is based on constant voltage control, when chargeability of a negative electrode plate is reduced, a potential of negative electrode decreases at an initial stage of charge and a voltage rapidly rises up to a preset voltage value, and a current decreases sooner. Thus, a sufficient amount of charged electricity of a lead acid battery can not be secured, thereby rendering the battery to be in an undercharged state.

For suppressing such deterioration, there has been proposed a method in Patent Document 1 in which a lead alloy layer containing Sn and Sb is formed on a surface of a positive electrode grid of a Pb—Ca—Sn alloy, for example. The formation of such layer suppresses a deterioration of the positive electrode active material and a formation of a passivated layer at an interface between the positive electrode active material and the positive electrode grid.

Also, a part of Sb which exists on a surface of the positive electrode grid dissolves in an electrolyte, and deposits on a negative electrode plate. The deposited Sb on a negative electrode active material raises a charging potential of the negative electrode plate, and a charging voltage lowers down, thereby improving chargeability of a lead acid battery. As a result, deterioration of the lead acid battery due to insufficient charge during charge/discharge cycle is suppressed.

This method is very effective in an engine starting lead acid battery which is used while SOC is over 90%, and service life characteristics will drastically improve.

However, when a lead acid battery is to be used in a vehicle equipped with the above stop-and-go-system or the regenerative-braking-system, that is, when a lead acid battery is to be used in a mode in which charge/discharge is repeated under lower SOC range, there was a problem in that the water content in the electrolyte rapidly decreases at the end of its service life, while the chargeability could be secured.

When the water content in the electrolyte decreases, a negative electrode strap and a tab of negative electrode grid are exposed from the electrolyte. By being exposed to the oxygen in the air, a welded part of the strap and the tab is corroded, leading to a possibility of a disconnection.

Also, even the negative electrode strap and the tab of negative electrode grid are being immersed in the electrolyte, the tab of negative electrode grid is easily being corroded when Sb is deposited in a very small amount on a surface of the tab of negative electrode grid by dissolution of Sb included in the positive electrode grid, and in a positive electrode connecting member comprising a positive electrode strap and a positive electrode pole or a positive electrode connecting body into an electrolyte.

Patent Document 1: Japanese Laid-Open Patent Publication No. Hei 3-37962

DISCLOSURE OF INVENTION

Problem that the Invention is to Solve

Thus, an object of the present invention is to provide a lead acid battery with a longer service life and high reliability under a usage mode where a charge/discharge is repeated frequently while SOC is in a low range, by improving chargeability, suppressing a decrease in an amount of electrolyte due to repeated charge/discharge, and suppressing a corrosion of the negative electrode grid.

Means for Solving the Problem

The present invention is a lead acid battery including:
an electrode plate pack comprising a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive electrode plate and the negative electrode plate;

a positive electrode connecting member comprising a positive electrode strap to which the tab of each positive electrode plate of the electrode plate pack is connected, and a positive electrode pole or a positive electrode connecting body provided at the positive electrode strap; and a negative electrode connecting member comprising a negative electrode strap to which the tab of each negative electrode plate of the electrode plate pack is connected, and a negative electrode pole or a negative electrode connecting body provided at the negative electrode strap, wherein the positive electrode grid, the negative electrode grid, the positive electrode connecting member, and the negative electrode connecting member comprise a Pb-alloy including at least one of Ca and Sn, the negative electrode active material layer includes 0.0001 to 0.003 parts by weight of Sb per 100 parts by weight of the negative electrode active material, and the positive electrode grid has a lead alloy layer including 0.01 to 0.2 parts by weight of Sb per 100 parts by weight of the positive electrode active material on at least a part of a surface thereof where the positive electrode active material layer is in contact.

It is preferable that the Sb content in the lead alloy layer is 0.01 to 0.15 parts by weight per 100 parts by weight of the positive electrode active material.

It is preferable that the Sb content in the negative electrode active material layer is 0.0001 to 0.002 parts by weight per 100 parts by weight of the negative electrode active material.

It is preferable that the separator comprises a glass fiber or a synthetic fiber having resistance to acids.

EFFECTS OF THE INVENTION

According to the present invention, a lead acid battery with a longer service life and high reliability can be obtained even under a usage mode in which charge/discharge is frequently repeated under a comparatively low range of SOC, since chargeability is improved and corrosion of the tab of negative electrode grid is suppressed. A lead acid battery with excellent maintenance-free characteristics can be obtained, since the decrease in an amount of electrolyte due to charge/discharge cycles is suppressed. Also, although there is a possibility for the battery to be in an over-discharge state under such usage mode, according to the present invention, corrosion of a tab of negative electrode grid can be suppressed even under the over-discharge state.

BEST MODE FOR CARRYING OUT THE INVENTION

The present invention relates to a lead acid battery for vehicles carrying a stop-and-go-system and a regenerative-braking-system. In the present invention, a Pb-alloy substantially not including Sb which advances corrosion of a tab of negative electrode grid is used for a positive electrode grid, a positive electrode connecting member, a negative electrode grid, and a negative electrode connecting member. Sb in an amount of 0.0001 to 0.003 parts by weight per 100 parts by weight of negative electrode active material is included in a negative electrode active material layer, and a lead alloy layer including Sb in an amount of 0.01 to 0.2 parts by weight per 100 parts by weight of positive electrode active material is formed on at least a part of a surface of the positive electrode grid where a positive electrode active material layer is in contact. Based on such battery, a service life of the battery can be extended significantly for a usage mode of the above systems which repeat charge/discharge frequently under a low SOC range.

Figure 1:
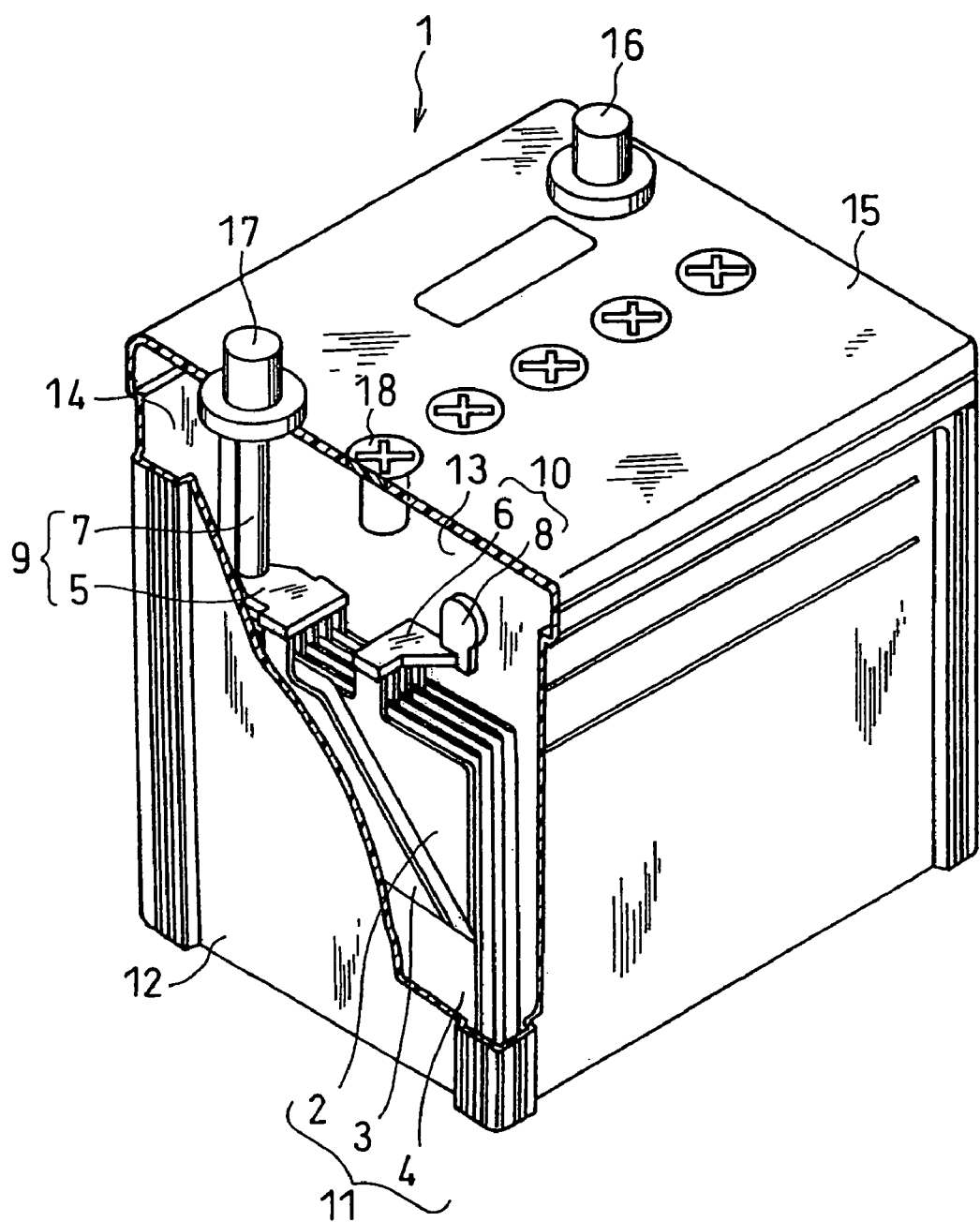
FIG. 1 A partially cut away perspective view of a lead acid battery of an example of the present invention.

In the following, embodiments of the present invention are explained in detail. FIG. 1 is a partially cut away perspective view of a lead acid battery of the present invention.

A battery container 12 of a lead acid battery 1 is divided by partitions 13 to have a plurality of cell chambers 14, and an electrode plate pack 11 is stored in each cell chamber 14. The electrode plate pack 11 is structured by stacking up a plurality of positive electrode plates 2 and negative electrode plates 3 interposing a separator 4 in between a respective pair of positive and negative electrode plates. The positive electrode plate 2 is connected to a positive electrode connecting member 10, and the negative electrode plate 3 is connected to a negative electrode connecting member 9.

In the electrode plate pack 11, a tab 22 of positive electrode grid of the positive electrode plate 2 is connected to a positive electrode strap 6, and a tab 32 of negative electrode grid of the negative electrode plate 3 is connected to a negative electrode strap 5. A positive electrode connecting body 8 connected to the positive electrode strap 6 of the electrode plate pack 11 in one cell chamber 14 is connected with a negative electrode connecting body connected with a negative electrode strap of an electrode plate pack 11 inside of adjacent cell chamber 14 via a through hole provided in the partition 13. Thus, one electrode plate pack 11 is connected with another electrode plate pack 11 in adjacent cell chamber 14 in series. A positive electrode pole is formed on a positive electrode strap at one end of the battery container 12, and a negative electrode pole 7 is formed on the negative electrode strap 5 on another end of the battery container 12.

Thus, the positive electrode connecting member 10 comprises the positive electrode strap 6 to which the tab 22 of positive electrode grid is connected, and the positive electrode pole or the positive electrode connecting body 8 provided on the positive electrode strap 6; and the negative electrode connecting member 9 comprises the negative electrode strap 5 to which the tab 32 of negative electrode grid is connected, and the negative electrode pole 7 or the negative electrode connecting body provided on the negative electrode strap 5.

A lid 15 provided with a positive electrode terminal 16 and a negative electrode terminal 17 is attached to an opening of the battery container 12. The positive electrode pole and the negative electrode pole are respectively connected to the positive electrode terminal 16 and the negative electrode terminal 17. In a liquid inlet provided on the lid 15, a vent cap 18 having an opening for ventilation to eject a gas generated inside of the battery to the outside of the battery is attached.

Figure 2:
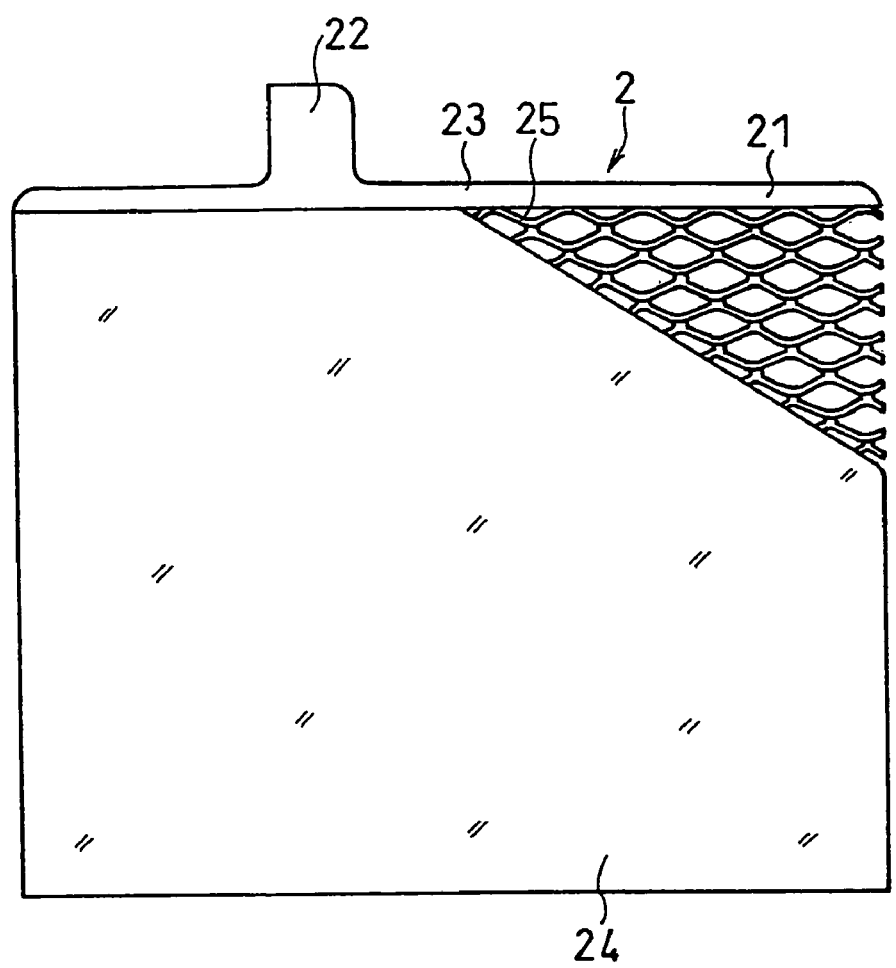
FIG. 2 A front view of a positive electrode plate of the same lead acid battery.

A front view of a positive electrode plate 2 is illustrated in FIG. 2.

A positive electrode plate 2 comprises a positive electrode grid 21 having a tab 22 and a positive electrode active material layer 24 retained by the positive electrode grid 21. The positive electrode active material layer 24 mainly comprises a positive electrode active material ($PbO_2$), and other than the positive electrode active material, the positive electrode active material layer 24 may include a small amount of a conductive material such as a carbon, and a binder, for example. The positive electrode grid 21 is an expanded grid comprising an expanded mesh 25 retaining the positive electrode active material layer 24, a frame 23 provided on an upper edge of the expanded mesh 25, and the tab 22 connected to the frame 23.

The positive electrode grid 21 and a positive electrode connecting member 10 comprise a Pb-alloy including at least one of Ca and Sn.

For the Pb-alloy, a Pb—Ca alloy including 0.01 to 0.10 wt % of Ca, a Pb—Sn alloy including 0.05 to 3.0 wt % of Sn, or a Pb—Ca—Sn alloy including Ca and Sn may be used, in terms of corrosion resistance and mechanical strength. It is preferable that the positive electrode grid comprises a Pb—Ca—Sn alloy including 0.03 to 0.10 wt % of Ca and 0.6 to 1.8 wt % of Sn. It is further preferable that the Pb—Ca—Sn alloy includes 0.8 to 1.8 wt % of Sn.

The Pb-alloy including at least one of Ca and Sn used for the positive electrode grid and the positive electrode connecting member does not include Sb substantially. However, Sb in a very small amount of approximately below 0.002 wt % may be included as impurity in the Pb-alloy, to the extent which will not give adverse effects to the battery performance due to increases in electrolyte loss and self-discharge. When the Sb content in the positive electrode grid and the positive electrode connecting member is to such extent, Sb will not migrate to the negative electrode plate.

Also, in order to improve corrosion resistance of the positive electrode grid, the lead alloy of the positive electrode grid body may include 0.01 to 0.08 wt % of Ba and 0.001 to 0.05 wt % of Ag. When the lead alloy including Ca is to be used, about 0.001 to 0.05 wt % of Al may be added in order to suppress dissipation of Ca from molten lead alloy due to oxidation. Also, 0.0005 to 0.005 wt % of Bi may be included as an impurity.

The positive electrode grid 21 has a lead alloy layer including 0.01 to 0.2 parts by weight of Sb per 100 parts by weight of the positive electrode active material on at least a surface thereof where the positive electrode active material layer is in contact. Based on this lead alloy layer, chargeability of the positive electrode plate after a deep discharge or over discharge, and service life characteristics improve.

Since Sb included in the positive electrode plate exists in the lead alloy layer formed on a surface of the positive electrode grid within an amount of the above limit, an increase in an amount of self discharge and a decrease in an amount of electrolyte can be suppressed. Thus, an advancement of the corrosion of the tab of negative electrode grid can be suppressed.

The service life characteristics decline when the Sb content in the lead alloy layer is below 0.01 parts by weight per 100 parts by weight of the positive electrode active material. When the Sb content in the lead alloy layer is over 0.2 parts by weight per 100 parts by weight of the positive electrode active material, the speed for the electrolyte decrease is accelerated, and corrosion of the tab of negative electrode grid gradually advances.

It is preferable that the lead alloy layer includes 0.01 to 0.15 parts by weight of Sb per 100 parts by weight of the positive electrode active material, because effects to suppress the corrosion of the tab of negative electrode grid and the electrolyte loss can be obtained remarkably.

It is preferable that the lead alloy layer further includes 2.0 to 7.0 wt % of Sn, since generation of a passivated layer on the interface between the positive electrode active material layer and the positive electrode grid can be suppressed. When the positive electrode grid includes Sn, it is preferable that the Sn content in the lead alloy layer is more than the Sn content in the positive electrode grid. For example, when the positive electrode grid includes 1.6 wt % of Sn, it is preferable that the lead alloy layer includes Sn of at least over 1.6 wt %, and it is further preferable that the Sn content in the lead alloy layer is 3.0 to 6.0 wt %. When the Sn content in the lead alloy layer is less than the Sn content in the positive electrode grid, the above effects of Sn become less, due to the existence of the lead alloy layer having less Sn content at the interface between the positive electrode grid and the positive electrode active material layer.

The positive electrode grid having the lead alloy layer including Sb in at least a part of the surface thereof where the positive electrode active material layer is in contact can be obtained in the following manner, for example. A base material sheet comprising a Pb-alloy, and a lead alloy foil including Sb are supplied in between a pair of rollers and the lead alloy foil is pressed to attach onto the base material sheet, thereby obtaining a composite sheet comprising a base material layer and a lead alloy layer. At this time, the lead foil is pressed to attach onto a part of the base material sheet where at least an expanded mesh is formed by an expanding mentioned layer. Then, an expanded grid is obtained by expanding. It is preferable that a thickness of the base material layer in the composite sheet is 0.7 to 1.3 mm, and a thickness of the lead alloy layer is 1 to 20 μm.

Figure 3:
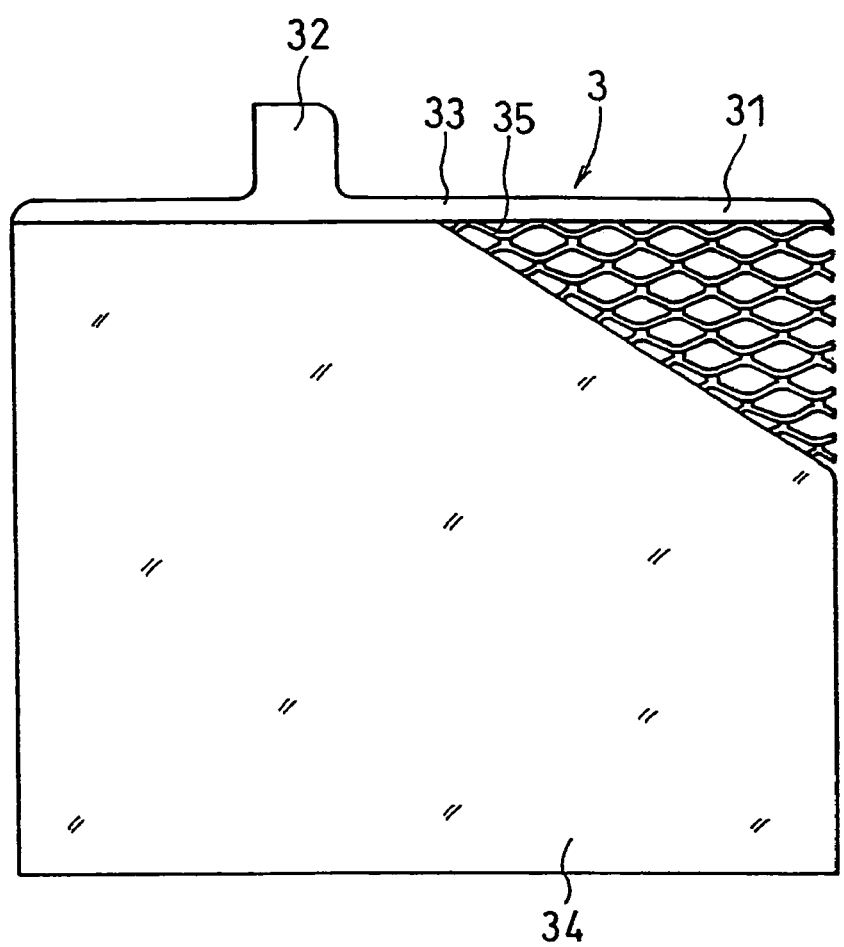
FIG. 3 A front view of a negative electrode plate of the same lead acid battery.

A front view of a negative electrode plate 3 is shown in FIG. 3.

A negative electrode plate 3 is formed with a negative electrode grid 31 having a tab 32, and a negative electrode active material layer 34 retained by the negative electrode grid 31. The negative electrode active material layer 34 mainly comprises a negative electrode active material (Pb), and may include, other than the negative electrode active material, a small amount of an expander such as lignin and barium sulfate, a conductive material such as a carbon and the like, and a binder. The negative electrode grid 31 is an expanded grid comprising an expanded mesh 35 in which the negative electrode active material layer 34 is retained, a frame 33 provided on an upper edge of the expanded mesh 35, and the tab 32 connected to the frame 33.

The negative electrode grid 31 and a negative electrode connecting member 9 do not substantially include Sb, and comprise a Pb-alloy including at least one of Ca and Sn. However, the Pb-alloy may include a trace amount of Sb below 0.001 wt % as an impurity. The amounts of self discharge and electrolyte loss do not increase, when the Sb content is to such extent. The corrosion of the tab of negative electrode grid does not advance as well.

Although a Pb—Ca—Sn alloy can be used for the negative electrode grid, as in the positive electrode grid, Sn is not essential, since the negative electrode grid is less prone to corrosion compared with the positive electrode plate. A Pb-alloy including 0.2 to 0.6 wt % of Sn may be used in the negative electrode grid, in order to improve strength of negative electrode grid, and to improve fluidity of molten lead at the time of producing the grid. Alternatively, a Pb-alloy including 0.03 to 0.10 wt % of Ca may be used, in view of mechanical strength.

The negative electrode active material layer 34 includes 0.0001 to 0.003 parts by weight of Sb per 100 parts by weight of the negative electrode active material. By including Sb which is lower in hydrogen overvoltage than the negative electrode active material in the negative electrode active material layer, the charge potential of the negative electrode plate shifts to a noble direction, and the chargeability of the negative electrode plate is drastically improved. Additionally, the corrosion of the tab of negative electrode grid can be suppressed, because Sb in the negative electrode active material layer barely dissolves into the electrolyte.

The service life characteristics are improved especially when the Sb content in the negative electrode active material layer is not less than 0.0001 parts by weight per 100 parts by weight of the negative electrode active material. On the other hand, when the Sb content in the negative electrode active material layer is over 0.003 parts by weight per 100 parts by weight of the negative electrode active material, the corrosion of the tab of negative electrode grid advances gradually.

It is preferable that Sb content in the negative electrode active material layer is 0.0001 to 0.002 parts by weight per 100 parts by weight of the negative electrode active material, since the effects of suppressing the corrosion of the tab of negative electrode grid and suppressing the electrolyte loss due to charge/discharge cycles can be obtained remarkably.

As for the addition of Sb to the negative electrode active material layer, Sb, an oxide or sulfate of Sb, or a compound including Sb such as an antimonate may be added at the time of producing a negative electrode paste, for example. Other than these, Sb can be electrodeposited on the negative electrode active material, by electroplating by immersing the negative electrode plate in an electrolyte including Sb ion, for example, dilute sulflic acid including an antimony sulfate, and antimonate.

The positive electrode plate 2 and the negative electrode plate 3 may be obtained by a method illustrated below.

An unformed positive electrode plate can be obtained by filling a positive electrode paste into a positive electrode grid, and then curing and drying, for example. In the positive electrode paste, a raw material lead powder (a mixture of lead and lead oxide), sulfuric acid, water, and the like are mixed.

Also, an unformed negative electrode plate can be obtained by filling a negative electrode paste into a negative electrode grid, and then curing and drying, for example. In the negative electrode paste, a raw material lead powder (lead and lead oxide), sulfuric acid, water, and an expander such as lignin and barium sulfate are mixed. For the lignin, natural lignin (VANILLEX N manufactured by Nippon Paper Chemicals, for example), and synthetic lignin such as a condensed bisphenol-sulfonate (VISPERSE P215 manufactured by Nippon Paper Chemicals, for example) and the like are used, for example.

Then, the above positive electrode plate 2 and the negative electrode plate 3 are obtained by forming the unformed positive and negative electrode plates. The forming may be conducted within a battery container of a lead acid battery made by using unformed positive and negative electrode plates, or may be conducted before composing an electrode plate pack at the time of producing a lead acid battery.

Although the expanded grid was used for the positive electrode grid and the negative electrode grid in the above, a casted grid may also be used.

A microporous polyethylene sheet is used for the separator 4. A carbon may be included in the polyethylene, in order to improve ion conductivity.

The microporous polyethylene sheet has electrolyte-permeable fine pores with a pore diameter of approximately 0.01 to 1 μm. When the diameter of the pore is over 1 μm, an active material easily passes through the separator.

For the separator 4, a fiber mat having resistance to oxidation is used. For the fiber, a glass fiber with a fiber diameter of 0.1 to 2 μm, or a synthetic fiber such as a polypropylene resin fiber and the like with a fiber diameter of 1 to 10 μm is used, for example. It is preferable that the separator comprises a fiber mat having resistance to oxidation, in view of obtaining excellent cycle life characteristics. Based on the fiber mat, separation of the positive electrode active material from the positive electrode plate can be suppressed.

For the separator, a polyethylene sheet or a fiber mat is folded to two (a letter-U shape) and a negative electrode plate is inserted therebetween, for example.

Each cell includes an electrolyte. And a positive electrode strap, a negative electrode strap, and an electrode plate pack are entirely immersed in the electrolyte. Since the negative electrode plate and the negative electrode strap do not contact with air, these are not easily oxidized. The present invention is not applied to a valve regulated lead acid battery which absorbs oxygen gas with a negative electrode plate, since the negative electrode active material layer includes Sb which is lower in hydrogen overvoltage than the negative electrode active material. When the present invention is applied to a valve regulated lead acid battery, based on a gas generation in a small amount, an internal pressure of the battery increases, and the control valve stays open for a long period of time. As a result, air flows into the battery and a negative electrode plate becomes oxidized, thereby making the battery prone to deteriorate.

Examples of the present invention are described in the following in detail.

EXAMPLE

Example 1

(1) Fabrication of Positive Electrode Plate

A positive electrode plate 2 shown in FIG. 2 was made as in the following.

A raw material lead powder (a mixture of lead and lead oxide), water, and a dilute sulfic acid were mixed and kneaded in a weight ratio of 100:15:5, to obtain a positive electrode paste.

(A) In the Case Where Positive Electrode Grid with No Sb Included Is Used

The base material sheet comprising a Pb-alloy containing 0.06 wt % of Ca and 1.6 wt % of Sn obtained by casting was pressed to have a thickness of 1.1 mm. After predetermined slits were formed on the base material sheet 27, the slits were expanded to form an expanded mesh 25 (FIG. 4 (*a*)), to obtain an expanded grid body (expansion process). A center part of the base material sheet 27 was not expanded, since the part is to be used for forming a tab 22 and a frame 23 of the positive electrode grid mentioned later.

Figure 4:
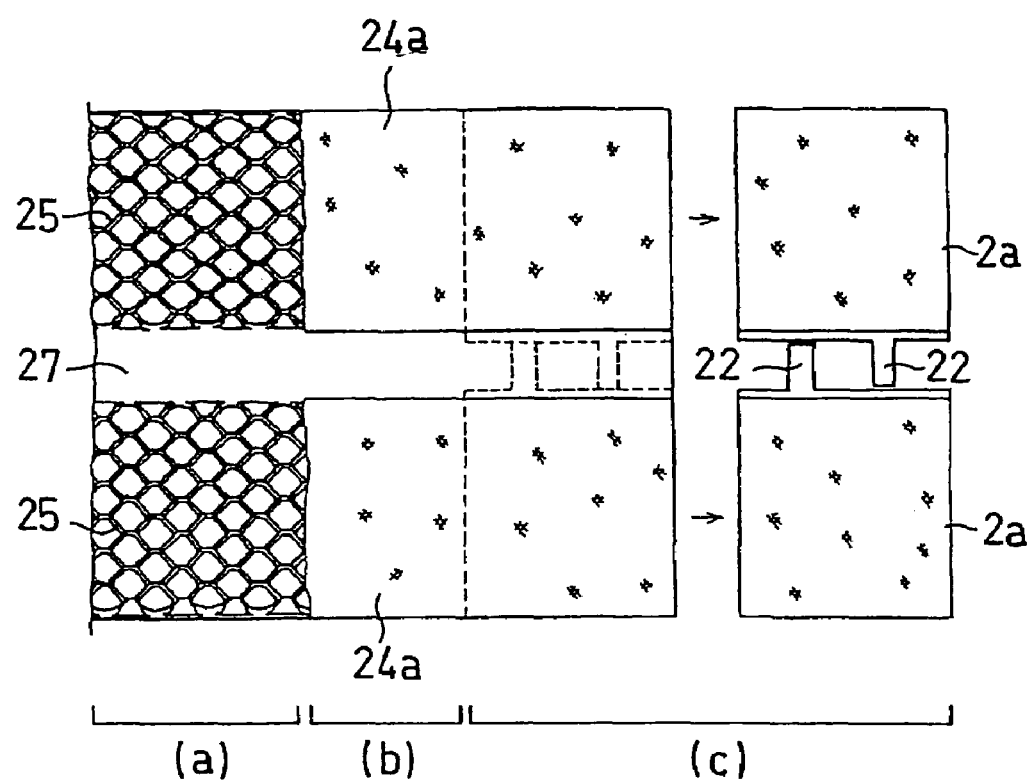
FIG. 4 An illustration of a step of expanding a base material sheet.

A positive electrode paste 24*a* was filled into the expanded grid 25 (FIG. 4 (*b*)), and was cut and formed to have an electrode plate shape having the tab 22 of positive electrode grid (FIG. 4 (c)). The expanded grid thus cut and formed was cured and dried, to obtain an unformed positive electrode plate 2a. Then, the unformed positive electrode plate 2a was formed in a battery container, mentioned later, to obtain the positive electrode plate 2 in which the positive electrode grid 21 retained the positive electrode active material layer 24.

Figure 5:
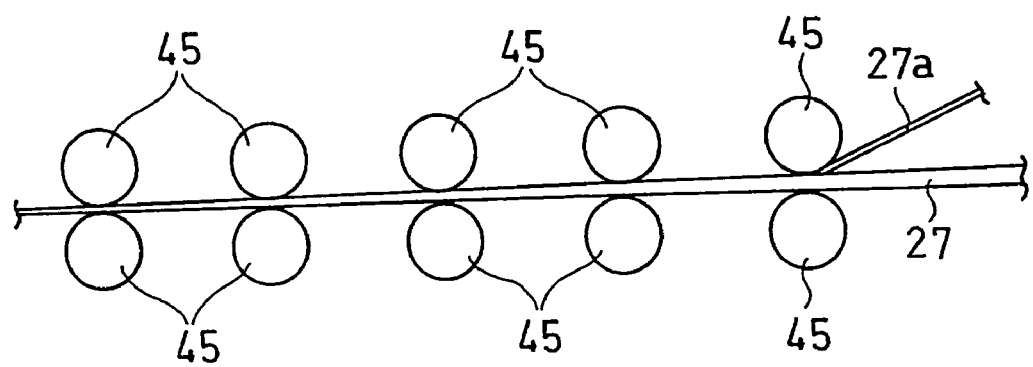
FIG. 5 An illustration of a step of obtaining a composite sheet used for producing a grid body.

(B) In the Case Where Positive Electrode Grid Having Lead Alloy Layer Including Sb on a Surface Thereof is Used As shown in FIG. 5, a lead alloy foil 27a was supplied with a base material sheet 27 in between a pair of rollers 45, and the base material sheet 27 and the lead alloy foil 27a were simultaneously pressed, in a pressing step of a positive electrode grid fabrication. By this pressing process, the lead alloy foil 27a was attached onto the base material sheet 27, and a composite sheet having a lead alloy layer with a thickness of 20 μm on one side of a base material layer with a thickness of 1.1 mm was obtained. A lead alloy containing Sb was used for the lead alloy foil 27a. For the base material sheet 27, a Pb-alloy including 0.06 wt % of Ca and 1.6 wt % of Sn was used.

For the part of the base material sheet 27 where the lead alloy foil 27a was to be pressed onto, only a part where an expanded mesh was to be formed in an expanding process mentioned later was pressed, and the lead alloy foil was not pressed onto a center part of the base material sheet 27 where a tab 22 of positive electrode grid is to be formed, as shown in FIG. 4.

Figure 6:
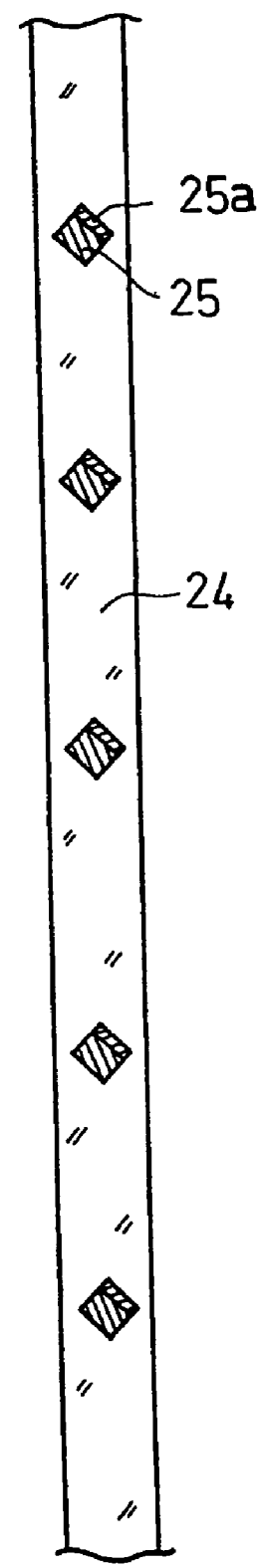
FIG. 6 A longitudinal sectional view showing a portion of a positive electrode plate using a positive electrode grid body having a lead alloy layer on a surface thereof.

A positive electrode plate 2 was obtained in the same manner as the above, except that an expansion process was conducted for the composite sheet. In this positive electrode plate, the expanded mesh 25 having rhombic cross sections has the lead alloy layer 25a including Sb on a surface thereof, as shown FIG. 6.

(3) Fabrication of Negative Electrode Plate

The negative electrode plate 3 shown in FIG. 3 was fabricated as shown below.

A raw material lead powder, water, dilute sulfic acid, and a natural lignin (VANILLEX N manufactured by Nippon Paper Chemicals) and a barium sulfate as an expander were kneaded in a weight ratio of 100:15:3.5:2.5:2.5 to obtain a negative electrode paste.

On the other hand, a base material sheet comprising a Pb-alloy containing 0.07 wt % of Ca and 0.25 wt % of Sn obtained by casting was pressed to have a thickness of 0.7 mm, and expanded in the same manner as the above. The expanded mesh was filled with the negative electrode paste, and an unformed negative electrode plate was obtained in the same manner as in the above. Then, the unformed negative electrode plate was formed in a battery container, mentioned later, to obtain the negative electrode plate 3 comprising the negative electrode grid 31 is retaining the negative electrode active material layer 34.

(4) Fabrication of Lead Acid Battery

A lead acid battery 1 with a structure shown in FIG. 1 was made by the following method. FIG. 1 is a partially cut away perspective view of a lead acid battery.

Five pieces of the negative electrode plate 3 and four pieces of the positive electrode plate 2 obtained in the above were respectively stacked alternately interposing the separator 4 to obtain an electrode plate pack 11. Herein, a glass fiber mat with a thickness of 1.00 mm (average fiber diameter of 0.8 μm) was used for the separator 4. The glass fiber mat was folded to two and the negative electrode plate was inserted therebetween, to dispose the separator 4.

Subsequently, the homopolar tabs 22 and the homopolar tabs 32 were respectively welded together, to obtain a positive electrode strap 6 and a negative electrode strap 5. Each of the electrode plate packs 11 was stored in six cell chambers 14 partitioned by partitions 13 in the battery container 12. Adjacent electrode plate packs were connected in series by connecting a positive electrode connecting body 8 connected to the positive electrode strap 6 with a negative electrode connecting body connected to a negative electrode strap. In this example, the connection between the electrode plate packs were made by through hole (not shown) provided at the partitions 13.

In the electrode plate packs stored in cell chambers 14 positioned at both ends, a positive electrode pole was formed on the positive electrode strap in one electrode plate pack, and a negative electrode pole 7 was formed on the negative electrode strap 5 in other electrode plate pack. Then, a lid 15 was attached to an opening of the battery container 12, while a positive electrode terminal 16 and a negative electrode terminal 17 provided on the lid 15 were welded with the positive electrode pole and the negative electrode pole 7. Subsequently, a predetermined amount of sulfuric acid with a concentration of 34 wt %, as an electrolyte, was pored in each cell from a liquid inlet provided on the lid 15, and a formation was conducted in the battery container. After the formation, vent caps 18 having vent holes for ejecting a gas generated inside the battery to the outside were fixed into the liquid inlet, to obtain a lead acid battery of 34B19 type (12V-27Ah) (hereinafter referred to as a battery) specified in JIS D5301. After the formation, the electrode plate pack 11, the positive electrode strap 6, and the negative electrode strap 5 were entirely immersed in the electrolyte.

In fabrication of the positive electrode plate using the positive electrode grid having the lead alloy layer on the surface thereof of the above, the Sb content in the lead alloy layer was changed to 0.005 parts by weight, 0.01 parts by weight, 0.1 parts by weight, 0.15 parts by weight, 0.2 parts by weight, and 0.25 parts by weight per 100 parts by weight of the positive electrode active material.

In fabrication of the negative electrode paste of the above, the antimony sulfate was added to the negative electrode paste so that the Sb content in the negative electrode active material layer at the time of completing the formation became 0 (below the detection limit of 0.0001 wt %), 0.0001 parts by weight, 0.002 parts by weight, 0.003 parts by weight, and 0.004 parts by weight per 100 parts by weight of the negative electrode active material.

For the positive electrode connecting member and the negative electrode connecting member, a Pb-alloy containing 2.5 wt % of Sn was used. As a result of a quantitative analysis for the Sb content in the Pb-alloy containing 2.5 wt % of Sn, the Sb content was below the detection limit (0.0001 wt %).

Then, as shown in Tables 1 and 2, the positive electrode grid having the lead alloy layer with different Sb content on the surface thereof, and the negative electrode plate retaining the negative electrode active material layer with different Sb content were used in various combinations to make batteries A1 to A4, B1 to B5, C1 to C5, D1 to D5, E1 to E5, F1 to F5, and G1 to G5.

Batteries D1' to D5' were produced in the same structure with the batteries D1 to D5 except that a Pb-alloy containing 2.5 wt % of Sb was used for the positive electrode connecting member and the negative electrode connecting member.

At the time of producing the positive electrode plate, batteries H1 to H5 were produced in the same structure with the batteries D1 to D5, except that a lead alloy foil including 0.1 parts by weight of Sb per 100 parts by weight of the positive electrode active material and 5 wt % of Sn were used.

In Tables 1 and 2, the batteries C2 to C4, D2 to D4, E2 to E4, F2 to F4, and H2 to H4 are the batteries of Examples. Other batteries in Tables 1 and 2 are the batteries of Comparative Examples.

TABLE 1

| | Sb Content in Lead Alloy Layer of Positive Electrode Plate (parts by weight) | Sb Content in Negative Electrode Active Material (parts by weight) | No. of Cycles (Cycle Life) | Corrosion Rate of Tab of Negative Electrode Grid (%) | Amount of Electrolyte Loss (%) |
|---|---|---|---|---|---|
| A1 | 0 | 0 | 660 | 3 | 3 |
| A2 | 0 | 0.0001 | 760 | 3 | 3 |
| A3 | 0 | 0.002 | 790 | 3 | 3 |
| A4 | 0 | 0.004 | 900 | 3 | 16 |
| B1 | 0.005 | 0 | 760 | 3 | 3 |
| B2 | 0.005 | 0.0001 | 840 | 3 | 3 |
| B3 | 0.005 | 0.002 | 940 | 3 | 3 |
| B4 | 0.005 | 0.003 | 980 | 3 | 4 |
| B5 | 0.005 | 0.004 | 1240 | 3 | 17 |
| C1 | 0.01 | 0 | 800 | 3 | 3 |
| C2 | 0.01 | 0.0001 | 1320 | 3 | 3 |
| C3 | 0.01 | 0.002 | 1540 | 3 | 4 |
| C4 | 0.01 | 0.003 | 1520 | 3 | 4 |
| C5 | 0.01 | 0.004 | 1440 | 3 | 18 |
| D1 | 0.1 | 0 | 860 | 3 | 4 |
| D2 | 0.1 | 0.0001 | 1470 | 3 | 4 |
| D3 | 0.1 | 0.002 | 1560 | 3 | 4 |
| D4 | 0.1 | 0.003 | 1520 | 3 | 5 |
| D5 | 0.1 | 0.004 | 1470 | 3 | 18 |
| D1' | 0.1 | 0 | 820 | 68 | 36 |
| D2' | 0.1 | 0.0001 | 870 | 70 | 36 |
| D3' | 0.1 | 0.002 | 890 | 74 | 38 |
| D4' | 0.1 | 0.003 | 900 | 74 | 38 |
| D5' | 0.1 | 0.004 | 920 | 76 | 40 |

TABLE 2

| | Sb Content in Lead Alloy Layer of Positive Electrode Plate (parts by weight) | Sb Content in Negative Electrode Active Material (parts by weight) | No. of Cycles (Cycle Life) | Corrosion Rate of Negative Electrode Grid (%) | Amount of Electrolyte Loss (%) |
|---|---|---|---|---|---|
| E1 | 0.15 | 0 | 960 | 3 | 4 |
| E2 | 0.15 | 0.0001 | 1380 | 3 | 4 |
| E3 | 0.15 | 0.002 | 1530 | 4 | 5 |
| E4 | 0.15 | 0.003 | 1460 | 4 | 6 |
| E5 | 0.15 | 0.004 | 1430 | 4 | 20 |
| F1 | 0.2 | 0 | 490 | 4 | 5 |
| F2 | 0.2 | 0.0001 | 1310 | 5 | 6 |
| F3 | 0.2 | 0.002 | 1560 | 5 | 6 |
| F4 | 0.2 | 0.003 | 1440 | 5 | 7 |
| F5 | 0.2 | 0.004 | 1330 | 6 | 28 |
| G1 | 0.25 | 0 | 1000 | 45 | 11 |
| G2 | 0.25 | 0.0001 | 1530 | 46 | 13 |
| G3 | 0.25 | 0.002 | 1560 | 46 | 16 |
| G4 | 0.25 | 0.003 | 1260 | 47 | 21 |
| G5 | 0.25 | 0.004 | 1140 | 47 | 30 |
| H1 | 0.1 | 0 | 1060 | 3 | 4 |
| H2 | 0.1 | 0.0001 | 1540 | 3 | 4 |
| H3 | 0.1 | 0.002 | 1680 | 3 | 4 |
| H4 | 0.1 | 0.003 | 1540 | 3 | 6 |
| H5 | 0.1 | 0.004 | 1470 | 3 | 18 |

As a result of a quantitative analysis for the Sb amounts in the base material sheet used for the positive electrode grid, the positive electrode active material layer, and the negative electrode grid, it was found that the amounts of Sb were below the detection limit (0.0001 wt %) in any of the results.

The evaluations shown below were conducted for each battery thus obtained.

(5) Evaluations for Cycle Life Characteristics

A light-load service life test was conducted as in the following, based on JIS D5301, in order to evaluate cycle life characteristics.

The weights of the batteries were measured before the cycle life test. A step of discharging the battery for 20 minutes at a current of 25A under 40° C. ambient temperature, and then charging for 10 minutes at a constant voltage of 14.8V (maximum charging current 25A) was repeated 480 times for charge/discharge cycles. Afterwards, the battery weight was measured again, and the amount of weight loss before and after the charge/discharge cycle was obtained. Then, the battery was discharged for 30 seconds at a current of 272A. A discharging voltage at the $30^{th}$ second (hereinafter shown as V30) was obtained, and then water was supplemented in an amount of the weight loss of the battery.

V 30 was obtained at every 480th cycle, and the end of the service life of the battery was set to when V30 was reduced to 7.2V. The number of cycles of the battery life was obtained in the following method. When V30 obtained in $n^{th}$ time (a number of charge/discharge cycle is obtained by 480×n) became 7.2V or less for the first time, the V30 is set as Vn, and the V30 obtained in previous $(n-1)^{th}$ time is set as Vn-1. Then, in a graph setting a vertical axis as V30, and a horizontal axis as a number of charge/discharge cycle, coordinates (480(n-1), Vn-1) and coordinates (480n, Vn) are connected with a liner line, and the value of the horizontal axis at a point of intersection of this line and V30=7.2 was made the number of cycles (cycle life).

(6) Measurement of Corrosion Rate of Tab of Negative Electrode Grid

The thickness of the tab of negative electrode grid was measured before the test. Then, a step of discharging the battery for 60 seconds at a current of 25A, and then charging for 60 seconds at a constant voltage of 15V was repeated 150 times. Subsequently, the battery was charged for 1 hour at a constant voltage of 14.5V, and then stored for 6 weeks. The battery after the storage was disassembled and the thickness of the tab of negative electrode grid was re-measured.

The corrosion rate (%) of the tab of negative electrode grid was calculated with a formula (T0−T1)/T0×100, by setting the thickness of the tab of negative electrode grid in the initial state before repeating the charge/discharge as T0, and setting the thickness of the tab of negative electrode grid after repeating the charge/discharge as T1.

The thickness of the tab of negative electrode grid was obtained by cutting a center part of the tab in the widthwise direction, and measuring a thinnest part of the tab with a microscope.

(7) Measurement of Electrolyte Loss Amount

A step of discharging the battery for 60 seconds at a current of 27A, and then charging for 90 seconds at a constant voltage of 14.5V was repeated 500 times. The amount of electrolyte loss (%) was calculated with a formula (E0−E1)/E0×100, by setting the electrolyte amount before repeating the charge/discharge as E0, and setting the electrolyte amount after repeating the charge/discharge as E1. The electrolyte amount is a total of the electrolyte amount of each cell.

The results of the above tests are shown in Tables 1 and 2.

When a Pb-alloy containing 2.5 wt % Sb was used, in any of the batteries, corrosion rate of the tab of negative electrode grid was high and the number of cycles (cycle life) was reduced. This was probably because Sb included in the positive and negative electrode connecting members was dissolved into the electrolyte, and the dissolved Sb was deposited to the tab of negative electrode grid.

In the batteries C2 to C4, D2 to D4, E2 to E4, and F2 to F4 of the present invention, in which positive and negative electrode connecting members comprising a Pb-alloy containing 2.5 wt % Sn, the negative electrode active material layer including 0.0001 to 0.003 parts by weight of Sb per 100 parts by weight of negative electrode active material, and the positive electrode grid having the lead alloy layer including 0.01 to 0.20 parts by weight of Sb on the surface of the expanded grid per 100 parts by weight of the positive electrode active material were used, an amount of electrolyte loss was suppressed, corrosion rate of the tab of negative electrode grid was reduced, and the number of cycles (cycle life) was increased.

Further, when the Sb content in the lead alloy layer was 0.01 to 0.15 parts by weight per 100 parts by weight of the positive electrode active material, and the Sb content in the negative electrode active material layer was 0.0001 to 0.002 parts by weight, effects of suppressing corrosion of the tab of negative electrode grid and suppressing the reduction in electrolyte amount were notably obtained, in addition to the improvement on cycle life characteristics.

When Sn was included in the lead alloy layer including Sb, the cycle life characteristics were further improved, since the formation of the passivated layer at an interface between the positive electrode grid and the positive electrode active material layer can be suppressed.

Example 2

Batteries I1 to I5, J1 to J5, K1 to K5, L1 to L5, M1 to M5, and N1 to N5 were produced in the same structure with the batteries B1 to B5, C1 to C5, D1 to D5, E1 to E5, F1 to F5, and G1 to G5 in Example 1 were respectively produced, except that a microporous polyethylene sheet (0.2 mm thickness) having a pore diameter of not more than 1 μm was used as a separator, and the sheet was folded to two to insert a negative electrode plate therebetween. The results of the same evaluation as in Example 1 conducted are shown in Table 3. In Table 3, the batteries J2 to J4, K2 to K4, L2 to L4, and M2 to M4 are the batteries of Examples. Other batteries in Table 3 are the batteries of Comparative Examples.

TABLE 3

| Sb Content in Lead Alloy Layer of Positive Electrode Plate (parts by weight) | Sb Content in Negative Electrode Active Material (parts by weight) | No. of Cycles (Cycle Life) | Corrosion Rate of Tab of Negative Electrode Grid (%) | Amount of Electrolyte Loss(%) |
|---|---|---|---|---|
| I1 | 0.005 | 0 | 660 | 3 | 3 |
| I2 | 0.005 | 0.0001 | 750 | 3 | 3 |
| I3 | 0.005 | 0.002 | 840 | 3 | 4 |
| I4 | 0.005 | 0.003 | 870 | 3 | 5 |
| I5 | 0.005 | 0.004 | 1110 | 3 | 17 |
| J1 | 0.01 | 0 | 770 | 3 | 3 |
| J2 | 0.01 | 0.0001 | 1200 | 3 | 3 |
| J3 | 0.01 | 0.002 | 1420 | 3 | 4 |

TABLE 3-continued

| Sb Content in Lead Alloy Layer of Positive Electrode Plate (parts by weight) | Sb Content in Negative Electrode Active Material (parts by weight) | No. of Cycles (Cycle Life) | Corrosion Rate of Tab of Negative Electrode Grid (%) | Amount of Electrolyte Loss(%) |
|---|---|---|---|---|
| J4 | 0.01 | 0.003 | 1330 | 3 | 5 |
| J5 | 0.01 | 0.004 | 1260 | 4 | 17 |
| K1 | 0.1 | 0 | 750 | 3 | 4 |
| K2 | 0.1 | 0.0001 | 1370 | 3 | 4 |
| K3 | 0.1 | 0.002 | 1450 | 3 | 4 |
| K4 | 0.1 | 0.003 | 1400 | 4 | 5 |
| K5 | 0.1 | 0.004 | 1350 | 4 | 18 |
| L1 | 0.15 | 0 | 840 | 3 | 4 |
| L2 | 0.15 | 0.0001 | 1280 | 3 | 4 |
| L3 | 0.15 | 0.002 | 1420 | 4 | 5 |
| L4 | 0.15 | 0.003 | 1340 | 4 | 6 |
| L5 | 0.15 | 0.004 | 1300 | 6 | 20 |
| M1 | 0.2 | 0 | 450 | 3 | 5 |
| M2 | 0.2 | 0.0001 | 1190 | 4 | 5 |
| M3 | 0.2 | 0.002 | 1400 | 4 | 5 |
| M4 | 0.2 | 0.003 | 1300 | 5 | 6 |
| M5 | 0.2 | 0.004 | 1260 | 5 | 28 |
| N1 | 0.25 | 0 | 910 | 44 | 11 |
| N2 | 0.25 | 0.0001 | 1410 | 45 | 14 |
| N3 | 0.25 | 0.002 | 1440 | 46 | 16 |
| N4 | 0.25 | 0.003 | 1200 | 47 | 23 |
| N5 | 0.25 | 0.004 | 1060 | 48 | 31 |

In the batteries J2 to J4, K2 to K4, L2 to L4, and M2 to M4 of the present invention, in which positive and negative electrode connecting members comprising a Pb-alloy containing 2.5 wt % Sn, the negative electrode active material layer including 0.0001 to 0.003 parts by weight of Sb per 100 parts by weight of the negative electrode active material, and the positive electrode grid having the lead alloy layer including 0.01 to 0.20 parts by weight of Sb on the surface of the expanded grid per 100 parts by weight of the positive electrode active material were used, the number of cycles (cycle life) was increased, while the amount of electrolyte loss was suppressed, and corrosion rate of the tab of negative electrode grid was reduced.

Further, when the Sb content in the lead alloy layer was 0.01 to 0.15 parts by weight per 100 parts by weight of the positive electrode active material, and the Sb content in the negative electrode active material layer was 0.0001 to 0.002 parts by weight, effects of suppressing corrosion of the tab of negative electrode grid and suppressing the reduction in electrolyte amount were obtained notably, in addition to the improvement on cycle life characteristics.

From Tables 1 to 3, it was revealed that the usage of glass fiber mat for the separator was preferable, since excellent cycle life characteristics can be obtained.

INDUSTRIAL APPLICABILITY

A lead acid battery of the present invention is suitably used for vehicles and the like which carry a stop-and-go-system and regenerative-braking-system, because of its excellent service life characteristics under a usage mode in which charge/discharge is repeated under a low SOC range.

The invention claimed is:

1. A lead acid battery including:
   an electrode plate pack comprising a plurality of negative electrode plates each of which comprises a negative electrode grid having a tab and a negative electrode active material layer retained by said negative electrode grid, a plurality of positive electrode plates each of which comprises a positive electrode grid having a tab and a positive electrode active material layer retained by said positive electrode grid, and a plurality of separators separating said positive electrode plate and said negative electrode plate;

a positive electrode connecting member comprising a positive electrode strap to which said tab of each positive electrode plate of the electrode plate pack is connected, and a positive electrode pole or a positive electrode connecting body provided at said positive electrode strap; and a negative electrode connecting member comprising a negative electrode strap to which said tab of each negative electrode plate of the electrode plate pack is connected, and a negative electrode pole or a negative electrode connecting body provided at said negative electrode strap, wherein:

said positive electrode grid, said negative electrode grid, said positive electrode connecting member, and said negative electrode connecting member comprise a Pb-alloy including at least one of Ca and Sn, said Pb-alloy substantially not including Sb, said negative electrode active material layer includes 0.0001 to 0.003 parts by weight of Sb per 100 parts by weight of a negative electrode active material, and said positive electrode grid has a lead alloy layer including 0.01 to 0.2 parts by weight of Sb per 100 parts by weight of a positive electrode active material on at least a part of a surface thereof where said positive electrode active material layer is in contact, said lead alloy layer having a thickness of 1 to 20 μm.

2. The lead acid battery in accordance with claim 1, wherein Sb content in said lead alloy layer is 0.01 to 0.15 parts by weight per 100 parts by weight of the positive electrode active material.

3. The lead acid battery in accordance with claim 1, wherein Sb content in said negative electrode active material layer is 0.0001 to 0.002 parts by weight per 100 parts by weight of the negative electrode active material.

4. The lead acid battery in accordance with claim 1, wherein said separator comprises a fiber having resistance to acids.

5. The lead acid battery in accordance with claim 4, wherein said fiber is a glass fiber or a synthetic fiber.

* * * * *